United States Patent [19]
Benson et al.

[11] 4,279,979
[45] Jul. 21, 1981

[54] NONWOVEN FIBROUS SUBSTRATE FOR BATTERY SEPARATOR

[75] Inventors: Arthur L. Benson, Suffield; David A. Jordan, Simsbury, both of Conn.

[73] Assignee: The Dexter Corporation, Windsor Locks, Conn.

[21] Appl. No.: 959,110

[22] Filed: Nov. 9, 1978

[51] Int. Cl.³ .............................................. H01M 2/16
[52] U.S. Cl. ..................................... 429/254; 428/288; 428/296; 428/297; 428/303; 428/903
[58] Field of Search ............... 428/288, 296, 297, 298, 428/299, 300, 304, 903, 303; 429/249, 250, 251, 252, 253, 254

[56] References Cited

U.S. PATENT DOCUMENTS

| | | | |
|---|---|---|---|
| 2,973,398 | 2/1961 | Hubbard et al. | 429/254 |
| 3,016,599 | 1/1962 | Perry | 428/903 |
| 3,560,318 | 2/1971 | Miller | 428/903 |
| 3,573,994 | 4/1971 | Field | 429/254 |
| 3,811,957 | 5/1974 | Buntin | 429/254 |
| 3,947,537 | 3/1976 | Buntin et al. | 429/254 |
| 3,967,978 | 7/1976 | Honda | 429/254 |
| 3,972,759 | 8/1976 | Buntin | 429/254 |
| 4,041,203 | 8/1977 | Brock et al. | 428/903 |
| 4,048,364 | 9/1977 | Harding et al. | 428/903 |
| 4,078,124 | 3/1978 | Prentice | 428/288 |
| 4,118,531 | 10/1978 | Hauser | 428/296 |

Primary Examiner—James J. Bell
Attorney, Agent, or Firm—Prutzman, Kalb, Chilton & Alix

[57] ABSTRACT

A substrate for an alkaline battery separator is made of a light weight, porous, heat bonded, synthetic organic sheet material having a basis weight of less than about 35 gsm and a thickness of less than about 200 microns. The major fibrous component is synthetic pulp comprising thermoplastic polyolefin fibers having a prefused microfibrillar structure similar to wood pulp. The minor fibrous component is a high tenacity polyamide fiber having a fiber length greater than about 6 mm. The heat bonding by partial fusion of the microfibrillar polyolefin is sufficient to impart to the sheet material a wet tensile strength of at least 400 g/in. width while permitting retention of air permeability of about 100 liters per minute and more. The substrate exhibits excellent receptivity to impregnation by pore-forming battery separator coatings and is particularly well suited for use in nickel-zinc batteries.

10 Claims, No Drawings

NONWOVEN FIBROUS SUBSTRATE FOR BATTERY SEPARATOR

BACKGROUND AND SUMMARY OF THE INVENTION

The present invention relates generally to battery separators for rechargeable alkaline cells and is more particularly concerned with a new and improved battery separator substrate well suited for use in alkaline batteries such as the nickel-zinc cell batteries.

In recent years the limits on available petro-chemical energy sources and the pollution problems attendent to internal combustion engines has engendered new interest in electrically powered automobiles. Heretofore one of the main disadvantages of such automobiles has been the lack of a practical rechargeable electrical energy source--namely, a battery capable of withstanding repeated deep discharge and peak performance after repeated recharging. The battery that appears to offer most promise in connection with this application is the rechargeable alkaline nickel-zinc battery using improved aerospace battery plate separators. This battery has three times the energy output of lead-acid or nickel-cadminum batteries of the same weight and can be produced at a comparable or lower cost. Additionally, the nickel-zinc type battery demonstrates an improved accelleration rate, can nearly double the driving range between recharging and can handle twice as many stop and go driving cycles per charge as comparable lead-acid batteries.

In attempting to optimize performance of the nickel-zinc battery it has been determined that one of the most important components of the battery is the separator and its ability to meet the cycle life requirements for electric automotive utilization. Additionally, it has been determined that separator cost is the most important priority in obtaining practical utilization of the nickel-zinc battery since the separator cost tends to control the total cost of the battery.

Heretofore research has centered on the inorganic/organic flexible separator developed by NASA. That separator comprises a nonwoven porous substrate such as an asbestos or cellulosic fiber base sheet covered or saturated with a coating mix of polyphenylene oxide, a polymeric polyester that reacts with the alkaline electrolyte and inorganic or organic fillers suited for forming the desired porous or micro-porous film. The asbestos substrate is of fuel cell grade and exhibits a thickness of about 10 mils. However, the health hazards associated with asbestos have received considerable publicity in recent years and its use is being phased out in many applications. The cellulosic fiber base sheet is merely newsprint and tends to degrade with time particularly within an alkaline environment. Also it is deficient in oxidation and abrasion resistance and tends to permit shorting of the battery due to zincate ion transfer and dendrite growth through the separator.

It has now been found that substantially improved separator substrates of extremely thin light weight web materials can be prepared at very low cost while avoiding the use of health hazardous materials such as asbestos. These improved substrates exhibit excellent caustic resistance and high permeability to electrolyte ion movement without promoting undesirable dendrite formation. Accordingly, it is a primary object of the present invention to provide a new and improved nonwoven battery separator substrate capable of exhibiting resistance to caustic degradation after prolonged high temperature exposure to concentrated alkaline conditions coupled with resistance to oxidation upon recharging, tolerance to deeper discharge cycling and reduced thickness and weight without sacrifice in strength.

Another object of the present invention is to provide a new and improved alkaline battery separator substrate that is of extremely low cost, is free of binder additives, and exhibits good electrical resistance yet provides excellent receptivity to porous battery separator impregnants or coatings, particularly coatings using an aqueous carrier.

Yet another object of the present invention is to provide an alkaline battery separator substrate that is comprised of low cost materials and is easy to manufacture on automated equipment and in large quantities thereby providing a substantial economic advantage in the battery made therefrom. Included in this object is the provision for an extremely thin battery separator substrate of light weight that facilitates the fabrication of a more compact battery design of enhanced operating performance.

Still another object of the present invention is the provision for a totally synthetic organic nonwoven substrate of the type described that exhibits high flexibility and the desired porosity yet high strength and structural integrity.

Other objects will be in part obvious and in part pointed out more in detail hereinafter.

These and related objects are achieved in accordance with the present invention by providing a nonwoven fibrous web material suited for use as a substrate for an alkaline battery separator comprised of a light weight, porous, heat bonded, synthetic organic sheet material having a basis weight of less than about 50 gsm and a thickness of less than about 200 microns, a major fibrous component of synthetic thermoplastic polyolefin fibers having a prefused microfibrillar structure to wood pulp and a minor fibrous component of a high tenacity polyamide fiber having a fiber length greater than about 6 mm. The heat bonding by partial fusion of the microfibrillar polyolefin is sufficient to impart to the sheet material a wet tensile strength of at least 400 g/in. width while retaining an air permeability of about 50 liters per minute and more. The substrate exhibits excellent receptivity to impregnation by pore-forming battery separator coatings.

A better understanding of the invention will be obtained from the following detailed description wherein the article of manufacture possesses the features, properties, and relation of elements described and exemplified herein.

DESCRIPTION OF A PREFERRED EMBODIMENT

The new and improved alkaline battery separator substrate of the present invention is produced in accordance with conventional papermaking techniques in order to obtain thin, light weight material of sufficient structural integrity to withstand the stresses encountered in handling the material on automated machinery. Thus the nonwoven fibrous web material is comprised of water dispersable fibers well suited to wet papermaking operations wherein the fibers are initially dispersed at very low consistencies within large amounts of an aqueous dispersing medium and subsequently deposited on a fiber collecting wire in the form of a thin continuous nonwoven web.

In accordance with the present invention the major fibrous component of the completely synthetic organic web material is a thermoplastic polyolefin having a structure similar to wood pulp, that is, it contains a microfibrillar structure comprised of microfibrils exhibiting a high surface area as contrasted with the smooth rod-like fibers of conventional synthetic man-made organic fibers. The synthetic thermoplastic pulp-like fibers can be dispersed to achieve excellent random distribution of the fibers throughout the dispersing medium and the resultant sheet product. The fibers found particularly advantageous are those made of the high density polyolefins of high molecular weight and low melt index. The polymeric materials preferably have a melt index below 0.1 and a viscosity average molecular weight greater than 40,000. In fact, the average molecular weight of the material typically is at least 500,000 and preferably greater than 800,000.

The fibers can be formed under high shear conditions in an apparatus such as a disc refiner or can be obtained in the form of high density polyethylene polymerized directly as fibers from ethylene gas. The resultant fibers have a typical size and shape comparable to the size and shape of wood fibers and are commonly referred to as "synthetic wood pulp." They exhibit an irregular surface configuration, have a surface area in excess of one square meter per gram, and may have surface areas of even 100 square meters per gram. The fibers exhibit a morphology or structure that comprises fibrils which, in turn, are made up of microfibrils, all mechanically inter-entangled in random bundles generally having a width in the range of 1-20 microns. In general the pulp-like fibers of polyolefins such as polyethylene, polypropylene and mixtures thereof have a fiber length well suited to the papermaking technique, e.g. in the range of 0.4 to 2.5 mm with an overall average length of about 1-1.5 mm. Typical examples of these materials are the polyolefins sold by Crown Zellerback Corporation under the designation "SWP", by Solvay and Cie under the designation "Pulpex" and by Sun Chemical Company and others.

Since the surface tension of pure polyolefins does not allow any water wettability, the material obtained commercially is frequently treated to improve both wettability and dispersability in aqueous suspension. The amount of wetting agent added, however, is relatively small and generally is less than about 5% by weight, e.g. about 3% by weight. The chemically inert polyolefins are thermoplastic materials that become soft with increasing temperature yet exhibit a true melting point due to their crystallinity. Thus, the synthetic pulp will exhibit a melting point in the range of 135° C.-150° C., depending on the composition and surface treatment of the material. In this connection it is possible to utilize the thermoplastic character of the material for partial fusion bonding of the nonwoven fibrous web made therewith. The heat treatment, of course, improves the wet strength of the web material and permits its handling during subsequent treating operations.

In accordance with the present invention, the sheet material contains other synthetic fibers since water laid webs containing 100% synthetic pulp would be very weak and excessively "tight", would not drain readily, and would require expensive binders to facilitate handling during subsequent coating operations. Consequently, it is preferred that the amount of synthetic polyolefin pulp-like fiber constitutes less than 90% by weight of the total fiber content of the sheet material and preferably between 50% and 80% by weight on a dry weight basis. In fact, the typical amount of synthetic pulp in the sheet material of the present invention falls within the range of 55-65% by weight of the total fiber content of the resultant web material.

The remaining fibers used in accordance with the present invention also are synthetic man-made organic fibers of the staple fiber type. The preferred materials are polyamide fibers of low denier and relatively long length, that is, nylon fibers having a denier of about 6 and less, and a length of 6 mm and longer, for example, a length in the range of 10-25 mm. The preferred polyamide fibers are of the high tenacity type and impart to the resultant fibrous web material a desirable dimensional stability. Additionally, the nylon fibers are needed to overcome the problem that would be present in a 100% synthetic wood pulp sheet in that the nylon fibers tend to open-up the sheet and provide improved runability at the at the wet end of the papermaking machine and greater porosity in the resultant web. The latter is particularly significant since the subsequent heat fusion bonding of the web material tends to tighten up the sheet and reduce the porosity thereof. Thus polyamide fibers such as the high tenacity nylon "P 105" supplied by Dupont has been used with good success.

The amount of polyamide used in the sheet material may vary. However, more than 5% should be present to impart its desirable characteristics. A percentage range of about 10-50 has been employed with satisfactory results, although it is generally preferred that the amount of nylon fibers be kept within the range of 10%-25%, particularly where yet additional synthetic organic fibers are to be used in the fibrous web material. In this connection it has been found desirable to also use other compatable synthetic organic materials such as polyolefin staple fibers in amounts up to as much as 40% and in fact, the preferred amount of such synthetic organic fibers used in addition to polyamide fibers falls in the range of 10-30%. The additional organic fiber component tends to reduce the wettability of the sheet material; however, this disadvantage is countered by the improvement in sheet formation and runnability achieved through the utilization of such materials. Typically the third fibrous component is polypropylene of low denier, i.e. from 1 to 3 denier, having a length of about 6-20 mm. As can be appreciated, other fibers such as polyethylene fibers and the like might be used in place of the polypropylene.

As mentioned, the sheet material of the present invention generally is made in accordance with conventional papermaking techniques, and preferably takes the form of a thin, light weight nonwoven fibrous structure where the major and minor fiber components are inter-entangled to provide sufficient structural integrity through simple physical entanglement to permit handling of the web during the papermaking operation without the need for expensive binders. The fibrous web thus formed is typically dried in a conventional manner by subjecting it to drying temperatures of about 220° F. and higher. In this way the synthetic polyolefin microfibrillar component softens during drying and thereafter approaches and partially exceeds its fusion temperature thereby bonding the web and imparting greater strength characteristics to the sheet material without substantially interfering with the necessary porosity thereof. As will be appreciated, the melting point of the pulp fiber will permit the web material to be dried immediately after formation without disadvantageous melting that might cause binder build-up on the dryer cans of the papermaking machine. However, as soon as the material is dried and prior to leaving the drying station, the temperature of the web material increases until it causes partial fusion of the microfibrillar structure and a slight shrinkage of the web material that is most noticeable in the cross-direction. The partial fusion results in shrinkage of the web material to the extent of about 10-15%. For example, a nonwoven fibrous web material having a cross dimension of about 27 inches will contract or shrink to a cross dimension of 24 inches during the preferred partial fusion operation. As mentioned, only partial fusion is desirable since the requisite porosity of the sheet material must be maintained. In this connection, heating of the sheet material for a period of less than three minutes at a temperature of 270° F. has been found to be effective. In fact, heating for less than two minutes is preferred, with an average heating time for "SWP" having a classified fiber length of 2 mm. (Grade R-830) being about 1.5 to 2 minutes at that temperature. As will be appreciated, the time during which the sheet material is exposed to the fusion temperature, will decrease as the fusion temperature increases.

The resultant partially fused web material exhibits the desirable characteristics of caustic and oxidation resistance. This is particularly important in an alkaline battery system since, in most instances, battery failure is primarily related to separator failure and it is desirable for the automotive batteries to have an operating life of at least 5 years. In accordance with the present invention, this is achieved by providing a sheet material that exhibits substantially no degradation upon exposure to concentrated caustic solution and highly oxidizing conditions. For example, the separator substrate of the present invention has been found capable of withstanding a highly concentrated (greater than 30%) potassium hydroxide solution at elevated temperatures (greater than 175° F.) continuously for over 300 hours, with no trace of alkaline degradation. Further, when the nonwoven substrate was subjected to prolonged exposure to nascent oxygen treatment it was found to be essentially unaffected.

Another important characteristic of the battery separator substrate is its thickness. Thinner separators permit the utilization of a larger number of battery plates and therefore provide a battery of comparable size with greater power and a more rapid power output, for example, as needed during accelleration of an electric automobile. The substrates of the present invention exhibit a thickness substantially below 200 microns and typically within the range of 50-150 microns. In fact, excellent results have been obtained with battery separator substrates having a thickness within the range of 75-130 microns.

It is frequently desirable to subject the sheet material to a calendering operation in order to reduce the thickness thereof and additionally impart added strength to the sheet material. It is an advantage of the present invention that the synthetic pulp used in the substrate permits a substantial reduction in the thickness of the web material upon calendering. As will be appreciated, the calendering operation also densifies the web material and reduces the air permeability. Thus, the calendering operation can not be so excessive as to reduce the permeability below an acceptable level and thereby substantially reduce the ability of the web to absorb the battery separator coating or impregnant. It is generally preferred that the permeability of the resultant web material be greater than 50 liters per minute using a Gurley air permeability test procedure (TAPPI T-251-PM-75) with values of approximately 100 liters per minute or greater being acceptable. Of course the preferred material will have a value greater than 100 and typically in the range of 200 to 300 liters per minute.

Related to porosity is the density of the sheet material which can be calculated upon determining both the thickness and weight of the sheet material. Thus the basis weight of the separator substrate of the present invention should be well below 50 grams per square meter and usually is less than 35 grams per square meter. Of course the preferred material is of a light weight falling in the range of about 22-28 grams per square meter.

As will be appreciated, the wet tensile strength of the material will vary but should be sufficient to permit handling of the material without adversely affecting the structural integrity thereof, for example, greater than 400 grams per inch of width. Typically the wet tensile strength of the web material in the machine direction will be 800 grams per inch width and greater with the preferred tensile strength being about 1000-1500 grams per inch width.

The following examples are given in order that the effectiveness of the present invention may be more fully understood. These examples are set forth for the purpose of illustration only and are not intended in any way to limit the practice of the invention. Unless otherwise specified, all parts are given by weight.

EXAMPLE 1

A fiber dispersion was prepared using the following fiber formulation, the amounts being on a dry fiber weight basis:
60% polyethylene pulp (SWP grade R-830);
15% nylon fibers, (Dupont P 105), 13 mm., 6 denier
25% polypropylene fibers, 13 mm., 1.8 denier
A minor amount, less than 0.5% by weight (based on the total fiber content), of a nonionic surfactant and a defoamer were added to the dispersion.

The fiber dispersion was fed to the forming wire of a wet papermaking machine and formed into a nonwoven web that was then dried on steam heated dryer drums. After drying, the sheet was heated to 270° F. for 1.8 minutes resulting in a cross dimension shrinkage from 27.5 inches to 24 inches. A portion of the sheet material was calendered using a calender pressure of 42 lbs. per inch and the physical properties of the sheet material before and after calendering were measured, as reported in Table 1.

TABLE 1

|  | Without Calendering | With Calendering |
|---|---|---|
| Basis Weight (g/m²) | 23 | 23 |
| Thickness (microns) | 148 | 79 |
| Dry Tensile Strength (g/25mm. width) | | |
| Machine Direction | 1570 | 1720 |
| Cross Direction | 590 | 610 |
| Wet Tensile Strength (g/25mm. width) | | |
| Machine Direction | 1370 | 1500 |
| Cross Direction | 510 | 530 |
| Air Permeability (1/min.) | 201 | 110 |

The calendered web material was tested for alkaline resistance and oxidation resistance and was found to be completely alkaline resistant and satisfactory upon nascent oxygen oxidation testing. The material also provided good wettability by a battery separator coating impregnant and was found to be fully acceptable as a battery separator substrate.

EXAMPLE 2

A fiber dispersion was prepared using the following fiber composition-
80%—polyethylene pulp (SWP R-830)
10%—high tenacity polyamide fibers, 13 mm. 6d
10%—polypropylene fibers, 6 mm. 3d A minor amount of a Karaya gum mix was used as a dispersing aid. An alkaline battery separator substrate was formed from the dispersion, as in Example 1. It exhibited a basis weight of 34 grams per square meter and a thickness of 165 microns. The dry and wet machine direction tensile strengths of the material were 1170 grams/25 mm width and 890 grams/25 mm width, respectively. The nonwoven fibrous web material exhibited an air permeability of 48 liters per minute.

The sheet was tested for alkaline resistance using a 31% potassium hydroxide solution at 80° C. and showed no sign of degradation after continuous exposure for 300 hours. The material also exhibited excellent resistance to oxidation, an electrical resistance of 0.035 ohm/cm$^2$ and was easily coated with a battery separator coating composition.

EXAMPLES 3–9

The procedure of Example 1 was repeated using different fiber compositions for the battery separator substrate. The compositions and the physical properties of the resultant nonwoven web material are set forth in Table 2.

TABLE 2

| Composition | Ex. 3 | Ex. 4 | Ex. 5 | Ex. 6 | Ex. 7 | Ex. 8 | Ex. 9 |
|---|---|---|---|---|---|---|---|
| Polyolefin pulp (SWP R-830) | 60 | 60 | 50 | 54 | 60 | 55.5 | 55 |
| Nylon P105 (6d,¼") | 15 | 40 | 50 | 23 | 20 | 26.0 | 20 |
| Polypropylene (3d,¼") | — | — | — | 23 | 20 | 18.5 | 25 |
| Polypropylene (1.8d, ¼") | 25 | — | — | — | — | — | — |
| Basis Wt. (g/m$^2$) | 25 | 27 | 33 | 29 | 21 | 29.0 | 22 |
| Thickness (microns) | 135 | 150 | 155 | 170 | 140 | 150.0 | 146 |
| Dry Tensile (g/25mm width) | | | | | | | |
| Machine Direction | 1710 | — | — | 1010 | 690 | 820.0 | 800 |
| Cross Direction | 610 | — | — | 490 | 370 | 420.0 | 400 |
| Wet Tensile (g/25mm width) | | | | | | | |
| Machine Direction | 1670 | 725 | 750 | 970 | 510 | 560.0 | 580 |
| Cross Direction | 590 | — | — | 420 | 290 | 300.0 | 280 |
| Air Permeability (l/m) | 430 | 174 | 150 | 364 | 510 | 349.0 | 614 |

As will be apparent to persons skilled in the art, various modifications, adaptations and variations of the foregoing specific disclosure can be made without departing from the teachings of the present invention.

We claim:

1. A nonwoven fibrous web material suited for use as a substrate for an alkaline battery separator comprising a light weight, porous, heat bonded, synthetic organic sheet material resistant to degradation upon prolonged exposure at elevated temperatures to a highly concentrated alkaline environment, said fibrous web material having a basis weight of less than 50 gsm and a thickness of less than about 200 microns, a major fibrous component of the web being a synthetic thermoplastic polyolefin fiber having a microfibrillar structure comprised of microfibrils similar to wood pulp, a minor fibrous component of the web being a polyamide fiber having a fiber length greater than about 6 mm, the heat bonding by partial fusion of the microfibrillar polyolefin being sufficient to impart to the sheet material a wet tensile strength of at least 400 g/in. width while retaining an air permeability greater than about 50 liters/min., said substrate exhibiting excellent receptivity to pore-forming battery separator coatings.

2. The nonwoven web material of claim 1 wherein the synthetic fiber pulp is present in an amount within the range of 50% to 80% by weight and the polyamide fibers are of high tenacity and are present in an amount within the range of 10% to 50% by weight.

3. The nonwoven web material of claim 1 wherein the basis weight is less than about 35 gsm, the synthetic fiber pulp is a high density polyolefin of low melt index and a high molecular weight greater than 40,000.

4. The nonwoven web material of claim 1 having a thickness within the range of 50–150 microns, the synthetic fiber pulp having a melting point in the range of 135°–150° C., and the web being partially fused sufficiently to provide a wet tensile strength of 800 g/in. width.

5. The nonwoven web material of claim 1 wherein the synthetic fiber pulp is a water dispersible high density polyolefin selected from the group consisting of polyethylene, polypropylene and mixtures thereof having a melt index below 0.1, and a high molecular weight greater than 500,000, said high density polyolefin including less than 5% by weight of a wetting agent enhancing the wettability of said web by said battery separator coating.

6. The nonwoven web material of claim 1 wherein the synthetic fiber pulp consists essentially of high density polyethylene having a melting point in the range of 135°–150° C., said partial fusion being no more than that obtained upon exposure of the web to a temperature equal to said melting point for less than 3 minutes.

7. The nonwoven web of claim 6 wherein said partial fusion is no more than that obtained upon exposure of said web to 270° F. for 1.5–2.0 minutes.

8. The nonwoven web material of claim 1 wherein the basis weight is less than about 35 gsm, the wet tensile strength is greater than 800 g/in. width, the air permeability is at least 200 liters per minute and said web includes polyolefin staple fibers.

9. The nonwoven web material of claim 1 wherein the polyamide fibers are of 6 denier and less, a length of 10 mm. and more and constitute 10–50% by weight of the fiber content, the web including 10–30% by weight of polyolefin staple fibers, the partial fusion being no more than that obtained upon exposure of said web to 270° F. for less than 3 minutes, said web being resistant to degradation upon exposure to 31% KOH at 80° C. for over 300 hours.

10. The nonwoven web material of claim 1 wherein the basis weight is about 22–28 gsm, the thickness is 75–130 microns, the synthetic fiber similar to wood pulp consists essentially of water dispersible high density polyethylene having a melting point in the range of 135°–150° C. and a molecular weight greater than 800,000, said synthetic pulp being present in amounts of 55%–65% by weight, the polyamide fibers constituting 10–25% by weight, said web including 10–30% by weight of a snythetic organic staple fiber compatable with said synthetic pulp and said polyamide fibers.

* * * * *